Patented Mar. 11, 1952

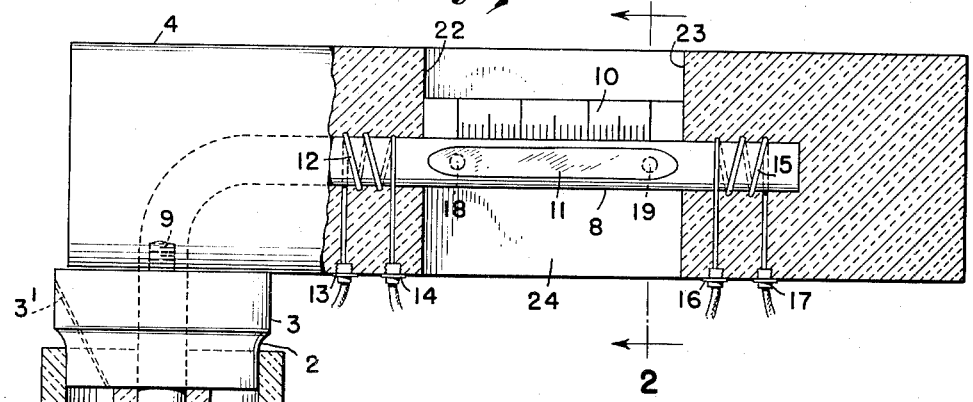
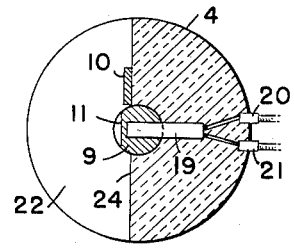
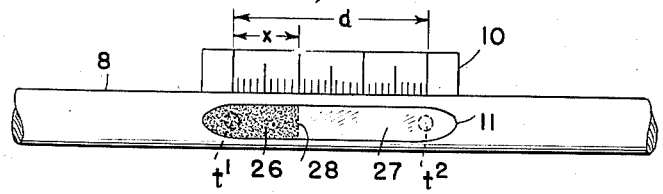

2,588,355

UNITED STATES PATENT OFFICE 2,588,355

METHOD AND APPARATUS FOR MEASURING DEW POINT

Horace K. Burr, San Pablo, and Glen F. Bailey, Berkeley, Calif., assignors to United States of America as represented by the Secretary of Agriculture Application June 25, 1948, Serial No. 35,275

5 Claims. (Cl. 73—17)

(Granted under the act of March 3, 1883, as amended April 30, 1928; 370 O. G. 757)

This application is made under the act of March 3, 1883, as amended by the act of April 30, 1928, and the invention herein described and claimed if patented in any country, may be manufactured and used by or for the Government of the United States of America throughout the world for governmental purposes without the payment to us of any royalty thereon.

This invention relates to a novel method and apparatus for measuring dew point.

Objects of this invention are to provide methods and apparatus for measuring dew point which are based on establishing a temperature gradient along the surface of a mirror. Further objects and advantages of this invention will be obvious from the description herein.

Many devices are known for measuring humidity. One type of device utilizes the expansion of materials when moist. Thus human hair, gelatin, etc., may be used for such purpose. Hygrometers of this type suffer from the disadvantage that they are not accurate because they are subject to hysteresis effects.

Another known device consists of a mirror, the temperature of which can be raised and lowered. This mirror is subjected to the atmosphere and while the temperature thereof is slowly lowered, the mirror is observed to detect formation of dew. When dew is noticed the temperature of the mirror is recorded as the dew point. The main disadvantages of this device are that it is inaccurate and slow. The inaccuracy is primarily due to a time lag. This lag is inherent in the device because an appreciable amount of moisture must be condensed from the air before it becomes detectable. Formation of a detectable amount of dew takes an appreciable time, hence when the dew is seen, the mirror is actually at a lower temperature than that at which the dew first formed. To reduce the effects of this time lag, the temperature may be lowered very slowly. Such technique makes the operation very slow. The time lag factor is especially deleterious at low temperatures, for instance, in measuring dew point of the air in refrigerated compartments. Air at low temperatures can hold only a small proportion of water vapor, consequently the formation of a visible amount of dew takes a substantial length of time, thus increasing the time lag.

This known device has another inherent defect when used at subfreezing temperatures which may be explained as follows: In this apparatus, as the temperature is lowered, the mirror is observed for the initial formation of condensed material or dew as it is usually called. Actually, at sub-freezing temperatures this condensed material may be either ice or super-cooled water. Since the film is extremely thin, as it must be to note the temperature at which it initially formed, it is impossible to determine whether it is ice or super-cooled water. A mistake in identity between these two phases may introduce a substantial error in the humidity calculated from the temperature observed.

We have invented a method and apparatus for measuring humidity which completely avoids the disadvantages of the prior art. According to our invention there is no need for tedious lowering of temperature and waiting for the first thin coating of dew to form. In our process and apparatus the dew is rapidly precipitated and the device can be left at constant conditions until a substantial film of dew is formed. There is no need for observing the point at which the dew is first formed. The only effect of time on our device is to increase the sharpness of the boundary between the fogged and unfogged areas. The measurements are accurate because there is no necessity for observing a fleeting phenomenon but rather one which is stable and permanent.

Further, in our device there can be no confusion between condensation of ice or super-cooled water. When the apparatus is used at sub-freezing temperatures it can be allowed to remain at equilibrium long enough to obtain a thick deposit of condensed material. With a thick deposit it is a simple matter to determine whether it is ice or super-cooled water merely by observation. Moreover, in most cases, it is impossible to obtain super-cooled water as the condensate. Since part of the mirror (that nearest the source of low temperature) is well below the dew point, it will be coated with ice crystals. These crystals of ice act as "seeds" causing crystallization of the condensate film. Thus the entire film will rapidly be converted into ice. It is thus evident that since the condensate phase can be definitely identified, the humidity calculated will be accurate.

The principle of the invention involves establishing a temperature gradient along the surface of a mirror and contacting the atmosphere and the mirror. Thereby the mirror will become fogged at the cooler end thereof. The fogged area will extend toward the warmer end and will exhibit a sharp boundary at the point in the mirror where the temperature of the mirror and the dew-point coincide.

The drawing annexed hereto demonstrates apparatus embodying the principle of this invention.

Fig. 1 represents a side elevation of the apparatus, partly in section.

Fig. 2 is a cross section taken on plane 2—2.

Fig. 3 is a view of the scale and mirror.

The apparatus shown in the drawing consists essentially of a means for producing a temperature gradient along a mirrored surface and a scale associated therewith to determine the length of the fogged area of the mirror and hence the temperature at the boundary between the fogged and unfogged areas. It is essential to have a source of cold (which may also be referred to as a "sink for heat") to reduce the temperature of the mirror at one end thereof below the dew point. This source of cold is supplied by Dewar flask 1 which is of the usual type—i. e., a double-walled glass vessel with an evacuated space between the two walls. This Dewar flask contains a slurry of solid carbon dioxide and acetone 25. Other mixtures of this type may be used such as solid carbon dioxide and ether, liquid nitrogen, ice and salt, etc. Rod 6 which is preferably made of a good heat-conducting metal such as copper or silver extends from near the bottom of the flask and out the top. At its lower end, rod 6 is provided with fins 7 to make for better heat transfer between rod 6 and slurry 25. A sleeve 5 is placed about rod 6 between the top of fins 7 and the bottom of stopper 2. This sleeve is preferably made of an insulating material such as asbestos, and is covered with a liquid-impermeable coating to prevent seepage therethrough of the cold slurry 25. The purpose of sleeve 5 is to obtain a steady supply of cold regardless of falling of surface of the slurry due to evaporation. Since heat transfer takes place substantially only through fins 7, a higher or lower liquid level in the flask 1 will not materially alter the flow of heat from rod 6 to the slurry 25. At its upper end rod 6 passes through stopper 2 and collar 3. These latter are preferably made of some insulating material such as asbestos. Stopper 2 is provided with a vent at 3' to allow release of gases from flask 1. At its extreme upper end rod 6 is provided with a threaded end 9 which can be screwed into a corresponding threaded hole in rod 8. Rod 6 is made separable to permit using rods of different cross-section or materials. Thereby the amount of heat transfer can be regulated in accordance with the temperature range in which the apparatus is employed. Rod 6 and rod 8 may be one continuous piece of material. Rod 8 extends from its junction with rod 6 and, after a quarter turn, extends in a horizontal direction. Rod 8, like rod 6, is made of a metal which is a good thermal conductor. It is essential that rod 8 be of uniform cross-section and composition. Jacket 4, made of an insulating material such as asbestos or glass fibers, surrounds rod 8. The surface of rod 8 is machined smooth and flat for a short distance to provide a mirror 11. This machining must be done accurately so that the machined portion of the rod (particularly the part of the rod extending from thermometer 18 to thermometer 19) will have a uniform cross-section. The machined surface of the rod is preferably coated with nickel or chromium to give a smooth bright mirror 11. Above mirror 11 is disposed a scale 10 which is marked with suitable graduations. In order to expose mirror 11 to the atmosphere to be measured for dew point, and in order to be able to observe scale 10, a section of jacket 4 is cut out. This section is bounded by planes 22, 23, and 24. For establishment of a proper temperature gradient across mirror 11, there are provided electric heaters 12 and 15. Terminals 13, 14, 16, and 17 are provided for connection with a suitable source of electricity. For measurement of the temperature gradient there are provided thermometers 18 and 19. These thermometers are preferably minute thermocouples or minute resistors having a high temperature coefficient of conductivity. In the latter case the temperature is determined by measuring the resistance of the resistor. Thermometer 19 is equipped with terminals 20, 21 for connection with suitable electrical measuring equipment. Thermometer 18 is similarly equipped with terminals (not illustrated).

In order to measure the dew point of the atmosphere, Dewar flask 1 is filled with a slurry of solid carbon dioxide and acetone. Current is then applied to heating coils 12 and 15 through adjustable resistances. The amount of current supplied to these coils is regulated so that a suitable temperature gradient will be established between the ends of scale 10. The temperature gradient selected depends on the type of measurement desired. For instance, if the scale is 100 mm. long the temperature gradient may be 5° C. This exact gradient is not essential. It is obvious that the more accurate a reading desired, the lower the temperature gradient which should be employed. For rough measurements, the temperature gradient may be higher. The length of the scale and the temperature gradient used are matters that may be adjusted to suit the particular needs of the operator. In all cases temperature at the end of the scale nearer the $CO_2$ bath must be maintained below the dew point of the atmosphere in order to obtain the dewing effect. In any case after the proper temperature gradient is obtained, the apparatus is allowed to remain until conditions come to equilibrium. The mirror 11 must be exposed to the atmosphere the dew point of which is under measurement. It is often preferable to use a fan to get good contact between the mirror and the atmosphere. When the air strikes mirror 11, assuming proper adjustment of the heaters 12 and 15, the mirror will be covered with fog in an area starting from the point nearest the $CO_2$ bath and extending to the point in the mirror where the temperature thereof and the dew point of the atmosphere are equal. For instance, if the dew point of the atmosphere is 17.5° C., the temperature at the left-hand end of the scale is 15° C. and the temperature at the right-hand end of the scale is 20° C., the mirror will be fogged from the left side up to the mid-point of the scale where it will end abruptly, leaving the other part of the mirror bright. The dew-point can be calculated from the formula (see Fig. 3).

$$T = \frac{x}{d}(t_2 - t_1) + t_1$$

where:

T=dew-point
$x$=length of fogged mirror
$d$=total length of mirror
$t_1$=temperature at cooler end of mirror
$t_2$=temperature at warmer end of mirror In Fig. 3 is shown schematically bar 8, mirror 11, and scale 10 under conditions wherein a deposit of dew is formed on the mirror. Area 26 of the mirror is covered with dew while area 27 is bright. The fogged and unfogged areas are separated by a sharp boundary 28. Since the temperature of mirror 11 varies in a linear fashion, the dew point can be calculated by the formula set forth above.

In the above description is shown a Dewar flask containing solid $CO_2$ as the source of low temperature. Other devices may be used for this purpose. For instance, one end of rod 8 could be placed in thermal connection with coil in which liquid ammonia or other refrigerant is evaporated. Obviously, the only purpose of flask 1 is to provide a source of constant low temperature and any of the devices or materials known in the art can be substituted for the modification shown in the drawings.

In the preferred modification of our apparatus is disclosed a scale 10 for measuring the length of the fogged area. Obviously, other devices can be used for this measurement. For instance, a traveling microscope equipped with a hairline scale would be suitable. Further, an enlarged view of the scale 10 and mirror 11 could be thrown on a screen by use of lens, mirrors, and other optical devices.

The method and apparatus herein disclosed and claimed is adapted to be used for measurement of dew points above or below 0° C. It is understood that where the dew-point is 0° C. or below, the cooler area of the mirror will be covered with frost rather than with dew or fog. However, exactly the same principle of operation holds—the boundary between frosted and unfrosted areas of the mirror is just as sharp as where the condensation is dew. Our device is therefore capable of measuring the humidity of air in refrigerated storage compartments. For the comfort of the operator, the device may be located outside the storage room while air from within is drawn out by means of a fan and blown across the mirror.

Hereinabove, the use of a linear temperature gradient in the mirror has been stressed. This linear gradient is obtained by using a mirror of uniform cross-section and composition. In most cases, such construction is preferable as then the scale is graduated in equal units and the dew point rapidly ascertainable. In some cases, however, it may be of interest to have the temperature gradient non-linear. This may be done by making the mirror non-uniform in cross-section or composition. In such case the scale will not have uniform graduations. One example wherein a non-linear gradient may be used would be in a device equipped for both accurate and rough measurements. Thus the mirror could be made in such geometrical shape that the temperature would vary slowly with respect to distance at one end and at the other end the temperature would vary sharply. Consequently, the first end could be used for accurate determinations while the latter end could be used for coarser determinations.

Having thus described our invention, we claim:

1. A method for determining the dew point of an atmosphere which comprises: establishing a linear temperature gradient along the surface of a mirror, the temperature being maintained below the dew-point toward one end of the mirror, the temperature toward the other end of the mirror being maintained above the dew point; contacting said mirror and said atmosphere, whereby the cooler end of the mirror will become fogged or frosted, exhibiting a sharp boundary at the point in the mirror where the temperature of the mirror and the dew point coincide; determining the temperature $t_1$ at a point 1 on the mirror below the dew point; simultaneously determining the temperature $t_2$ at a point 2 on the mirror above the dew point; measuring the distance from the said boundary to point 1; and determining the dew point according to the formula:

$$T=\frac{x}{d}(t_2-t_1)+t_1$$

where:

$T$ = dew point
$t_2$ = temperature at warmer end of mirror
$t_1$ = temperature at cooler end of mirror
$d$ = total length of mirror between points 1 and 2
$x$ = fogged (or frosted) length of mirror 2. In a method for determining the dew point of an atmosphere the improvement comprising: establishing a linear temperature gradient along the surface of a mirror, the temperature being maintained below the dew point toward one end of the mirror, the temperature toward the other end of the mirror being maintained above the dew point; contacting said mirror and said atmosphere, whereby the cooler end of the mirror will become fogged or frosted, exhibiting a sharp boundary at the point in the mirror where the temperature of the mirror and the dew point coincide; determining the temperature $t_1$ at a point 1 on the mirror below the dew point; simultaneously determining the temperature $t_2$ at a point 2 on the mirror above the dew point; and measuring the fogged or frosted length of the mirror and the distance between points 1 and 2.

3. An apparatus for determining dew point comprising: a heat conducting rod; means for cooling one end of the rod below the dew point of the atmosphere, said means comprising a container for a coolant liquid bath into which the rod projects downwardly, heat conducting surface extensions on the lower end of the rod, a heat insulating sleeve about the rod above the extensions and extending to at least the surface of the liquid bath, whereby the effect of fluctuations in the depth of the liquid bath is minimized, the heat conduction being chiefly through the submerged extensions; a dew collecting mirror extending lengthwise of the rod toward the other end thereof; heating means for the rod toward but beyond each end of the mirror; means fixed in position for measuring the temperature of the mirror at a point 1 toward one end of the mirror; means fixed in position for measuring the temperature of the mirror at a point 2 toward the other end of the mirror; and scale means for measuring the distance from one of said points to the boundary of the dew or frost that forms on the mirror upon exposure to the atmosphere.

4. An apparatus for measuring dew point of an atmosphere comprising: a heat conducting rod; means for cooling one end of the rod below the dew point of the atmosphere, the rod having a mirror surface toward the other end, extending lengthwise thereof; a thermometer fixed in position for measuring the temperature of the mirror at a point 1 toward one end thereof, a second thermometer fixed in position to simultaneously measure the temperature of the mirror at a point 2 of the mirror toward the other end thereof; heating means for the rod mounted toward each end of the mirror but not between points 1 and 2; and scale means for measuring the distance from one of points 1 and 2 to the boundary of the dew or frost that forms on the mirror upon exposure to the atmosphere.

5. The apparatus of claim 4 in which that portion of the rod having a mirror surface is uniform in cross-section and in heat conduction, to provide a linear temperature gradient lengthwise of the mirror.

HORACE K. BURR.
GLEN F. BAILEY.

REFERENCES CITED

The following references are of record in the file of this patent:

UNITED STATES PATENTS

| Number | Name | Date |
|---|---|---|
| 2,316,624 | Romanelli | Apr. 13, 1943 |
| 2,336,238 | Fordyce et al. | Dec. 7, 1943 |
| 2,415,776 | Walton | Feb. 11, 1947 |
| 2,464,546 | Albright | Mar. 15, 1949 |